United States Patent [19]
Cosson

[11] Patent Number: 4,618,006
[45] Date of Patent: Oct. 21, 1986

[54] RIPPER IMPLEMENT

[75] Inventor: Keith J. Cosson, Grand Island, Nebr.

[73] Assignee: C. C. Sales Corporation, Grand Island, Nebr.

[21] Appl. No.: 616,139

[22] Filed: Jun. 1, 1984

[51] Int. Cl.$^4$ ............................................. A01B 13/08
[52] U.S. Cl. .................................. 172/699; 172/773; 172/752
[58] Field of Search ............... 172/752, 700, 699, 773, 172/753, 772, 725, 721, 722, 713, 749

[56] References Cited

U.S. PATENT DOCUMENTS

| 2,095,165 | 10/1937 | Becker | 172/769 |
| 3,002,574 | 10/1961 | Padrick | 172/763 |
| 3,393,753 | 7/1968 | Perkins | 172/700 |
| 3,704,753 | 12/1972 | Hasforth | 172/700 |
| 4,127,073 | 11/1978 | Blair | 172/700 |
| 4,415,042 | 11/1983 | Cosson | 172/749 |

FOREIGN PATENT DOCUMENTS

| 31189 | 9/1926 | France | 172/752 |
| 567626 | 2/1945 | United Kingdom | 172/699 |
| 1217924 | 1/1971 | United Kingdom | 172/699 |

Primary Examiner—Richard J. Johnson
Attorney, Agent, or Firm—Dean P. Edmundson

[57] ABSTRACT

An improved ripper tiller implement is described which utilizes novel shank members including a soil fracturing member on the lower end of the shank. A replaceable shoe member may also be used on the shank.

13 Claims, 4 Drawing Figures

RIPPER IMPLEMENT

FIELD OF THE INVENTION

This invention relates to agricultural implements. More particularly, this invention relates to ripper implements and novel shank members for use on such implements.

BACKGROUND OF THE INVENTION

Agricultural implements of various types have been used through the years in order to loosen the soil. Some of these implements are intended for use in fields before the crops are planted, and other types have been used for cultivating between rows of growing crops. More recently there have been proposed implements which include working surfaces for shallow tilling and other working surfaces for deeper soil loosening action.

These types of implements include a downwardly depending shanking on which is carried a blade or shoe of one type or another, usually having a sharpened front edge portion. As the blade is pulled through the ground the blade tends to wear out rapidly, especially when tilling hard or gravelly soil. Thus, the blade must be replaced often.

The wear on the front or leading edge of the shank is also very significant. Accordingly, it is commonplace to weld a layer of very hard material (such as AR 400 hard steel, commercially available from Inland Steel Co.) to the leading edge of the shank to reduce the extent of this wear. However, such a technique necessary adds to the time and cost of manufacturing the shanks.

The replacement of work blades or shoes on these implements is often a great inconvenience, requiring the loosening and removal of bolts and the like, as well as involving considerable cost for replacement items. Although some types of blades or shoes may be replaced more easily than others, there still remains the cost for the replacement parts. In my copending application Ser. No. 06/546,291, filed Oct. 28, 1983, now abandoned incorporated herein by reference, I describe a self-sharpening shoe having extended wear life.

It has also been observed that large powerful tractors must be used in order to pull certain types of ripper tillers through the soil. Generally speaking, larger tractors are required for deeper tillage and maximum loosening of the soil. This can be a tremendous disadvantage for someone who does not own a large tractor.

Various types of tiller and plow implements are described in U.S. Pat. Nos. 4,415,042; 4,269,274; 3,268,012; 3,195,654; 3,170,421; 3,085,635; 3,042,118; 3,026,947; 2,940,192; 2,904,119; 2,860,861; 2,786,404; 2,222,071; 1,916,833; 1,073,984; 555,804; 80,015; 30,744; 19,262; Austria Pat. No. 207,603; and Australia Pat. No. 106027. None of these patents, however, describe a ripper tiller utilizing a novel ripper shank having the advantage provided by the present invention.

SUMMARY OF THE PRESENT INVENTION

In accordance with the present invention there is provided an improved agricultural ripper tiller. The term "ripper" as used herein refers to an implement adapted to operate about 12 to 18 inches below the surface of the ground for the purpose of ripping the hard pan and loosening the soil.

The novel improved ripper tiller implement includes a downwardly depending shank and a shoe member carried by the lower end of the shank. The leading edge of the shank is substantially straight, and a forwardly projecting soil fracturing member is secured to the leading edge of the shank above the shoe member. The soil fracturing member is aligned with, and directly in front of the leading edge of the shank.

The presence of the soil fracturing member on the leading edge of the shank fractures the soil ahead of the shank and, accordingly, wear of the leading edge of the shank is significantly reduced. This greatly extends the life of the shank. It also eliminates the need for securing a layer of very hard material to the front of the shank.

Another advantage of the improved tiller of this invention is that it requires less horsepower to pull it through the soil than prior tillers of comparable size and function. As a result, smaller and less expensive tractors may be used to pull the tiller than previously required. Consequently, good tillage can be performed more efficiently. Furthermore, the use of the improved tiller of this invention results in improved fracturing of the soil.

BRIEF DESCRIPTION OF THE DRAWINGS

The invention is described in more detail hereinafter with reference to the accompanying drawings, wherein like reference characters refer to the same part throughout the several views and in which.

DETAILED DESCRIPTION OF THE INVENTION

Figure 1:
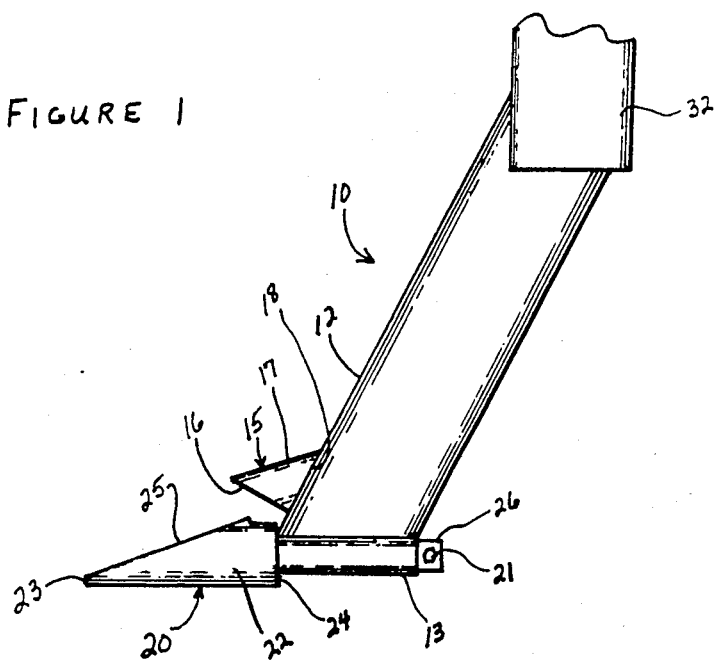
FIG. 1 is a side elevational view of a novel tiller shank of the present invention.
Figure 2:
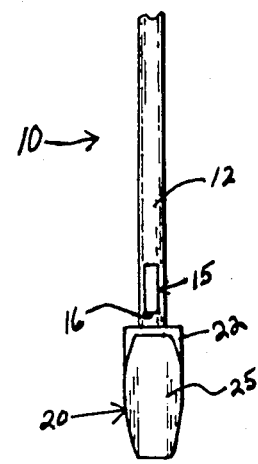
FIG. 2 is a front elevational view of the tiller shank shown in FIG. 1.

In the drawings there is shown a novel ripper shank 10 having a substantially straight front or leading edge 12. Shank 10 is adapted for use in an agricultural ripper tiller implement 30 (as shown, for example, in FIG. 3). The upper end of shank 10 may be secured to the lower end of depending arm 32 carried by frame 34.

To the lower end of shank 10 there is secured one type of replaceable ripper shoe 20 having a solid streamlined body 22, including sharpened toe portion 23 and rear portion 24. Inclined upper surface 25 extends from the toe portion upwardly toward the rear portion. The toe portion 23 is sharpened, for example, as shown in FIG. 1.

Attached to the rear face of body 22 is an attachment rod or member 26. Preferably rod 26 is non-circular in cross-section. Rod 26 is firmly and securely attached to body 22, e.g., by means of welds.

Preferably rod 26 is coaxially aligned with body 22, as shown. Rod 26 is also sa:aller in cross-section than rear portion 24 of body 22 so that it follows in the path of the shoe body and does not produce any additional drag.

Figure 3:
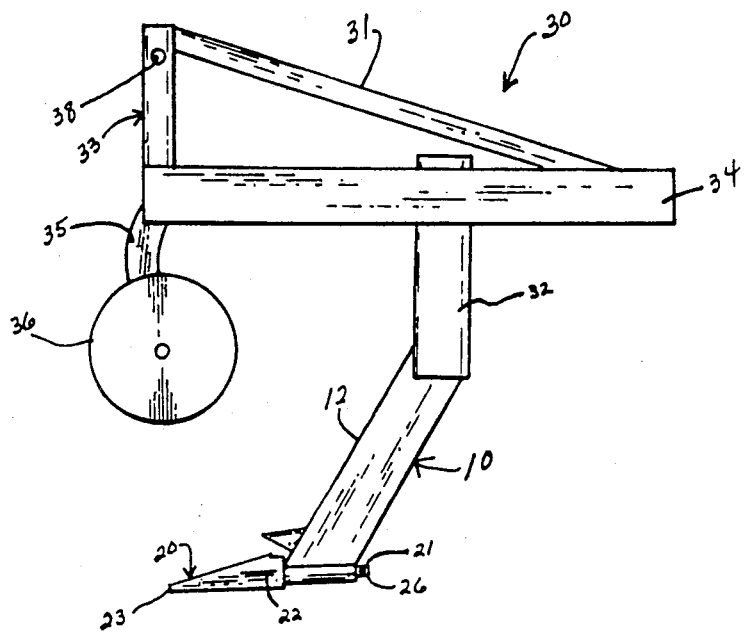
FIG. 3 is a side elevational view of an agricultural ripper tiller implement of this invention utilizing the novel shank and a replaceable shoe.
Figure 4:
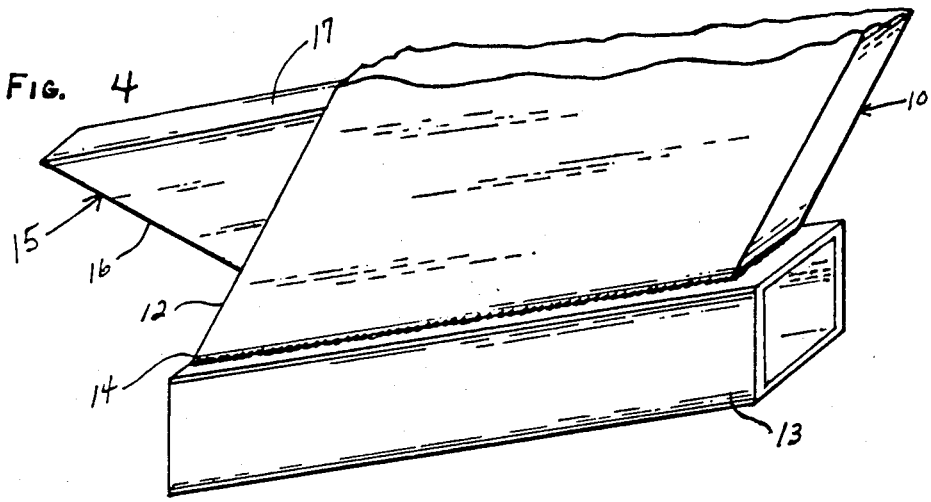
FIG. 4 is an isometric view of the lower end of a ripper shank useful in the tillers of the present invention.

The outer end of rod 26 preferably includes an opening which extends transversely through rod 26. Then when rod 26 is slipped through tubular member 13 on the lower end of shank 10, a common pin 21 may be inserted through the opening to prevent rod 26 and the shoe from becoming detached from the shank when the tiller is not being used. This is shown in FIG. 3. When it is desired to replace the shoe it is only necessary to remove the pin and slide the shoe forwardly to free rod 26 from tube 13. A new shoe may then be slipped into place. During operation of the tiller, of course, the soil pressure pushes the shoe tightly against the shank and it is self-retaining.

The design of replaceable shoe 20 is such that it is streamlined, i.e., it has smooth surfaces and is free of wings, fins, and other similar projections. It is also self-sharpening, i.e., as it wears during use it maintains the desired shape with a sharpened toe portion and a larger rear portion. Thus, the replaceable ripper shoe has a long useful life as compared to shoes in which one portion wears out faster than other portions.

The replaceable shoe is designed to be simply and readily attached to the bottom of ripper shank 10 by means of attachment rod 26, as explained above. The preferred ripper shank design is shown in the drawings. At the lower end of shank 10 there is securely attached a tubular member 13. This may be attached, for example, by welds 14. Tubular member 13 has a longitudinal opening therethrough so that rod 26 of shoe 20 may be slidably received therein, preferably with a snug fit.

Preferably tubular member 13 has a non-circular cross-section so that rod 26 is prevented from twisting within tube 13 during operation of the tiller. A preferred type of tube is rectangular (e.g., square) which is only slightly larger in diameter than rod 26 so that rod 26 snugly but slidably engages the interior of tube 13. Pin 21 may be slipped through the opening in the outer end of rod 26 to retain shoe 20 on shank 10. It is also possible to secure rod 26 to tube 13 by providing matching holes through each of them and then inserting a pin through the matching holes in the tube and the rod.

Secured to the leading edge of shank 10 near the lower end thereof is soil fracturing member 15 which may be triangularly shaped, for example. Member 15 is secured to the shank at a point just above shoe 20. Ordinarily this means that edge 16 of member 15 is about 0.5-0.75 inch above the top edge of tubular member 13. Preferably the lower edge 16 of member 15 projects outwardly from the leading edge of 12 of shank 10 a few inches (e.g., about 6 to 8 inches is preferred). It is also preferable for edge 16 to be perpendicular to edge 12.

When the member 15 is triangular (as shown), the length of edge 17 is preferably about 5 to 6 inches, and the length of edge 18 is preferably about 6 to 8 inches.

The thickness of member 15 is normally equal to or slightly less than the thickness of shank 10. When the shank is about one inch thick the thickness of member 15 is normally in the range of about 0.5 to one inch.

Member 15 may also have other shapes. For example, it may be rectangular or any other shape so long as it includes a lower edge which is capable of fracturing the soil. That is, the soil fracturing member is sufficiently large and has a configuration such that it is adapted to fracture the soil ahead of the shank. This reduces wear on the shank and also results in improved fracturing and loosening of the soil without heaving of the soil and without formation of slicks.

In FIG. 3 there is shown a side view of a ripper tiller of the invention having a frame 34 which is adapted to be attached to a tractor by means of hitch 33. Strut 31 assists in bracing the hitch. Opening 38 permits attachment of a lift arm from the tractor. Downwardly depending arm 32 is secured to frame 34 at its upper end, and it supports ripper shank 10. Arm 35 carries wheel 36 which is rotatably attached. Wheel 36 may be raised or lowered, as desired, and it controls the depth to which the shank and ripper shoe may descend. The ripper implement may have several ripper shanks and shoes attached to it, depending upon the length of frame 34 and the desires of the operator. In the side view of FIG. 3 only one shank and shoe are shown.

Preferably the ripper shoe is attached to the shank in such a manner that the toe portion is slightly lower than the rear portion during operation. For example, when the shoe is about 7 inches long and the attachment rod 26 is about 7 to 8 inches long, there preferably is a rise of about 1.5 inches from the toe portion to the end of the rod (i.e., about 7°). For most conditions it is preferred to keep this angle less than about 10°-15°. By increasing this angle the shoe tends to lift the soil more as it is pulled through it. If the angle is increased too much then there may be undesirable lifting of the soil or hooving. This, of course, is not desirable because it may result in row crops being covered with soil. The desired action is to fracture and loosen the soil from the shoe upward to the surface at a width of about 15 inches, without heaving the ground or generating slicks (lengths of compacted soil).

For the same reasons the front of the shank should be straight instead of curved. If the front of the shank is curved it tends to heave the ground and cause slicks to be propelled upward and out of the ground, which is very undesirable. A preferred size for the shank is six inches wide and one inch in thickness. The front edge of the shank may be sharpened also.

If desired, a hardened surface may be provided on the front or leading edge of the shank. For example, a layer of tungsten or tungsten carbide may be secured thereto to increase the wear resistance of the shank. It is also possible to include conventional hard surface weld beads on the front of the shank, if desired.

The ripper tiller of this invention may be used safely to rip the hard pan and loosen the soil between growing row crops without endangering the growing crops. Of course, this tiller may also be used effectively in fields not containing any crops.

Other variations are possible without departing from the scope of this invention. For example, the improved shanks of this invention may be used in conjunction with shoe members of various types other than the type illustrated in the drawings.

What is claimed is:

1. In an agricultural ripper tiller implement having a downwardly and forwardly depending shank and a shoe member slightly wider than said shank carried by the lower end of said shank, wherein the improvement comprises said shank having a leading edge, wherein a forwardly projecting soil fracturing member is secured to said leading edge of said shank spaced above said shoe member, wherein the lower edge of said soil fracturing member projects outwardly from said shank over the rearward end of said shoe member to present a downwardly facing surface capable of fracturing soil leaving said rearward end of said shoe member, and wherein said soil fracturing member is adapted to fracture soil ahead of said leading edge of said shank.

2. An improved ripper tiller implement in accordance with claim 1, wherein said soil fracturing member is triangular.

3. An improved ripper tiller implement in accordance with claim 1, wherein said soil fracturing member has a thickness less than that of said shank.

4. An improved ripper tiller implement in accordance with claim 1, wherein said soil fracturing member has a thickness approximately equal to that of said shank.

5. An improved ripper tiller implement in accordance with claim 1, wherein said shoe member is replaceable.

6. An improved ripper tiller implement in accordance with claim 1, wherein said soil fracturing member projects forwardly from said leading edge of said shank a distance of about 6 to 8 inches.

7. An improved ripper tiller implement in accordance with claim 2, wherein the lower edge of said soil fracturing member is generally perpendicular to said leading edge of said shank.

8. A shank which is adapted for use in an agricultural ripper tiller implement, said shank having a leading edge, wherein said shank is adapted to carry a shoe member on the lower end thereof, wherein a forwardly projecting soil fracturing member projects forwardly from said leading edge of said shank a distance of about 6 to 8 inches and is secured to said leading edge of said shank above said shoe member, wherein the lower edge of said soil fracturing member projects outwardly from said shank over the rearward end of said shoe member to present a downwardly facing surface capable of fracturing soil leaving said rearward end of said shoe member, and said soil fracturing member being adapted to fracture soil ahead of said leading edge of said shank.

9. A shank in accordance with claim 8, wherein said shoe member is replaceable.

10. A shank in accordance with claim 8, wherein said soil fracturing member is triangular.

11. A shank in accordance with claim 8, wherein said soil fracturing member has a thickness less than that of said shank.

12. A shank in accordance with claim 8, wherein said soil fracturing member has a thickness approximately equal to that of said shank.

13. A shank in accordance with claim 8, wherein the lower edge of said soil fracturing member is perpendicular to said leading edge of said shank.

* * * * *